United States Patent Office 3,585,235
Patented June 15, 1971

3,585,235
3-SUBSTITUTED - 2 - TRIFLUOROMETHYL-ACRYLOYL FLUORIDES AND THE PROCESS FOR THEIR PREPARATION
David C. England and Leonard Solomon, Wilmington, Del., assignors to E. I. du Pont de Nemours and Company, Wilmington, Del.
No Drawing. Filed Feb. 28, 1967, Ser. No. 619,162
Int. Cl. C07c 51/58, 63/00
U.S. Cl. 260—544                10 Claims

ABSTRACT OF THE DISCLOSURE

Described are substituted trifluoromethylacryloyl fluorides having a 3-substituent selected from dialkylamino, arylalkylamino, aryl, 5-membered ring aromatic heterocyclics having in addition to one or more carbon atoms the following ring members: oxygen, sulfur, imino, alkylimino, oxygen and up to 3 nitrogens, sulfur and up to 3 nitrogens, imino and up to 3 nitrogens, and alkylimino and up to 3 nitrogens, benzo-5-membered ring aromatic heterocyclics having in addition to one or more carbon atoms the following ring members: oxygen, sulfur, imino, alkylimino, oxygen and nitrogen, sulfur and nitrogen, imino and nitrogen, and alkylimino and nitrogen. The heterocyclic substituents are bonded to the trifluoromethylacryloyl fluoride moiety by a carbon-carbon bond. The claimed process for their preparation comprises the reaction of a formyl-containing compound with perfluoromethacrylyl fluoride at temperatures of 0–200° C. 3-substituted-2-trifluoromethylacryloyl fluorides are useful as treating agents for paper products and fabrics.

BACKGROUND OF THE INVENTION

This invention relates to substituted fluorinated-α,β-conjugated unsaturated carboxylic acid fluorides and to the process for their preparation.

SUMMARY OF THE INVENTION

This invention is directed to 3-substituted- 2-trifluoromethylacryloyl fluorides of the formula $$Z-\overset{H}{\underset{|}{C}}=\overset{CF_3}{\underset{|}{C}}-COF$$

wherein Z is a monovalent radical selected from the group consisting of:
(a) A multi-ring aromatic carbocyclic hydrocarbon group containing 10–18 carbons;
(b) An aromatic heterocyclic group of the formulae

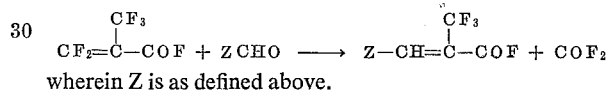

wherein Y is selected from the group consisting of O, S, and NR, R is selected from the group consisting of hydrogen and lower alkyl, one $Y^1$, $Y^2$, $Y^3$, or $Y^4$ is C— and the other $Y^1$, $Y^2$, $Y^3$ and $Y^4$ are selected from the group consisting of CH and N with the proviso that when four of Y, $Y^1$, $Y^2$, $Y^3$ and $Y^4$ contain N, R is lower alkyl; $Y^5$ or $Y^6$ is C— and the other $Y^5$ or $Y^6$ is CH or N;
(c) R'R''N— where R' is selected from tthe group consisting of lower alkyl and cycloalkyl and R'' is selected from the group consisting of lower alkyl and phenyl; and
(d)

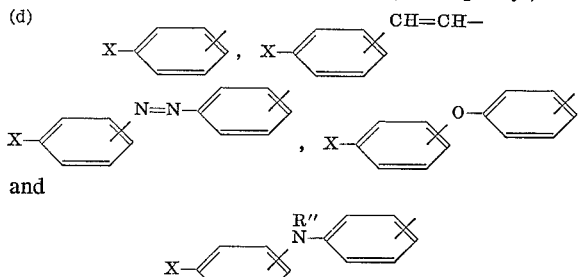

and

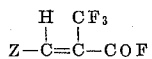

wherein X is selected from the group consisting of H, R'O—, R'S— and R'$_2$N—.

The compounds of this invention are prepared by reacting perfluoromethacrylyl fluoride with a formyl compound ZCHO at a temperature of 0–200° C. 3-substituted- 2-trifluoromethylacryloyl fluorides are useful as waterproofing agents for various papers and cellulosic materials. Some of the compounds are also useful as dyes.

DESCRIPTION OF THE PREFERRED EMBODIMENTS

The compounds of this invention are prepared by the reaction of perfluoromethacrylyl fluorides with a formyl compound, i.e., aldehydes and substituted formamides, according to the equation

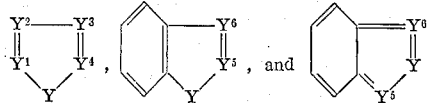

wherein Z is as defined above.

The reaction of the formyl compound with perfluoromethacrylyl fluoride can be exothermic when the formyl compound is electron rich such as N,N-dimethylformamide or p-N,N-dimethylaminobenzaldehyde. The exothermic reaction takes place readily at room temperature and depending upon quantities of the reactants used can require cooling to moderate the reaction. Other less reactive formyl compounds, such as furfural and benzaldehyde, do not produce an exothermic reaction and require heating in order to effect reaction. Compounds of this latter type can be conveniently used in the process at temperatures of about 100°–150° C. and above. Some product is produced at lower temperatures when the less reactive formyl compounds are used.

The process for preparing the compounds of this invention can be conducted by mixing the reactants neat. It is also convenient especially when the reactants produce an exothermic reaction, to moderate the process by adding the formyl reactants to perfluoromethacrylyl fluoride. The time required for addition of the formyl reactants can vary from a few minutes to several hours.

The molar ratio of the reactants ZCHO and perfluoromethacrylyl fluoride which can be brought together to carry out the reaction of this invention can be varied widely, i.e., from 10:1 to 1:10 respectively. Best yields of products are obtained when the formyl compound and perfluoromethacrylyl fluoride are respectively employed in the molar ratios in the range from 2:1 to 1:1.

The process of this invention can be carried out either in the presence or in the absence of additives, such as diluents or solvents. It is convenient to add a liquid reaction medium which is inert to the reactants and products. Such inert reaction media can be aromatic hydrocarbons such as benzene, toluene, xylene, and the like; ethers such as dimethyl ether, diethyl ether, and the like; or halocarbons such as chloroform, carbon tetrachloride, perchloroethylene, and the like.

Pressure is not critical in the process of this invention and pressures both above and below atmospheric pressure can be used. When temperatures above the boiling point of the reactants and/or reaction media are employed, it is convenient to operate in a closed system under autogenous pressure.

To minimize side reactions between the by-product $COF_2$ and the formyl compound ZCHO, it is convenient, though not essential, to provide for removal of the by-product, from the reaction mixture as it is formed. Removal can be effected by the use of partial or selective condensing of the reactants in reactions conducted under reflux.

Time of the reaction is not critical in the process embodiment of this invention. The length of time can be readily controlled by the choice of the reaction temperature. Reaction time for reactions having very fast rates can be dependent upon contact time and very short periods of time (i.e., one second to minutes) are operable. For reactions having slower rates of reaction, the time required for reaction can be a matter of about 1 hour or less to three or four days or longer depending upon the reaction conditions used.

Recovery and isolation of the product of this invention from the reaction mixture can be carried out by known methods of evaporation, distillation, sublimation and crystallization. For example, in some processes using reactants in equimolar ratios, it suffices to vent the $COF_2$ by-product and obtain the reaction product in a slightly impure but usable form. Other conventional recovery methods, such as distillation or recrystallization or combinations of these recovery methods can be used.

R, R' and R" defined above, preferably contain 1–6 carbons including such radicals as methyl, ethyl, n-propyl, isopropyl, n-butyl, isobutyl, t-butyl, n-pentyl, isopentyl, n-hexyl, isohexyl, cyclopropyl, cyclobutyl, cyclopentyl and cyclohexyl. R and R" are also preferably hydrogen and phenyl, respectively.

The multi-ring aryl hydrocarbon groups preferably contain 14 carbon atoms such as biphenyl, α-napthyl, β-naphthyl, 1-anthracyl and 1-phenanthryl.

The compounds of this invention wherein Z is a heterocyclic group are produced by the reaction of perfluoromethacrylyl fluoride with an aromatic heterocyclic aldehyde. Examples of aromatic heterocyclic aldehydes useful in the process embodiment of this invention include:

furan-2- and 3-carboxyaldehyde
thiophene-2- and 3-carboxaldehyde
pyrrole-2- and 3-carboxaldehyde
1-methylpyrrole-2- and 3-carboxaldehyde
1-hexylpyrrole-2- and 3-carboxaldehyde
1,2-oxazole-3-, 4- and 5-carboxaldehyde
1,3-oxazole-2-, 4- and 5-carboxaldehyde
1,2-thiazole-3-, 4- and 5-carboxaldehyde
1,3-thiazole-2-, 4- and 5-carboxaldehyde
1,2-diazole-3- and 4-carboxaldehyde
1,3-diazole-2- and 4-carboxaldehyde
1-methyl-1,2-diazole-3- and 4-carboxaldehyde
1-hexyl-1,2-diazole-3- and 4-carboxaldehyde
1-methyl-1,3-diazole-2,4- and 5-carboxaldehyde
1-hexyl-1,3-diazole-2,4- and 5-carboxaldehyde
1,3,4-oxadiazole-2-carboxaldehyde
1,3,4-thiadiazole-2-carboxaldehyde
1,3,4-triazole-2-carboxaldehyde
1-methyl-1,3,4-triazole-2-carboxaldehyde
1-hexyl-1,3,4-triazole-2-carboxaldehyde
1,2-oxadiazole-4- and 5-carboxaldehyde
1,2,3-thiadiazole-4- and 5-carboxaldehyde
1,2,3-triazole-4-carboxaldehyde
1-methyl-1,2,3-triazole-4- and 5-carboxaldehyde
2-hexyl-1,2,3-triazole-4-carboxaldehyde
1,2,4-oxadiazole-3- and 5-carboxaldehyde
1,2,4-thiadiazole-3- and 5-carboxaldehyde
1-methyl-1,2,4-triazole-3- and 5-carboxaldehyde
4-methyl-1,2,4-triazole-3-carboxaldehyde
1,2,3,4-oxatriazole-5-carboxaldehyde
1,2,3,4-thiatriazole-5-carboxaldehyde
1-ethyl-1,2,3,4-tetrazole-5-carboxaldehyde
1,2,3,5-oxatriazole-4-carboxaldehyde
1,2,3,5-thiatriazole-4-carboxaldehyde
1-methyl-1,2,3,4-tetrazole-5-carboxaldehyde
1-methyl-1,2,3,5-tetrazole-4-carboxaldehyde
1,2-benzofuran-3- and 4-carboxaldehyde
2,3-benzofuran-2-carboxaldehyde
1,2-benzothiophene-3- and 4-carboxaldehyde
2,3-benzothiophene-2-carboxaldehyde
indole-2- and 3-carboxaldehyde
1-methylindole-2- and 3-carboxaldehyde
1-hexylindole-2- and 3-carboxaldehyde
2,3-benzopyrrole-2-carboxaldehyde
4,5-benzo-1,2-oxazole-3-carboxaldehyde
4,5-benzo-1,2-thiazole-3-carboxaldehyde
4,5-benzo-1,2-diazole-3-carboxaldehyde
1-methyl-4,5-benzo-1,2-diazole-3-carboxaldehyde
4,5-benzo-1,3-oxazole-2-carboxaldehyde
4,5-benzo-1,3-thiazole-2-carboxaldehyde
1-methyl-4,5-benzo-1,3-diazole-2-carboxaldehyde Other n-alkyl-substituted heterocyclic aldehydes can be used, i.e., where the alkyl group is cyclohexyl, cyclopentyl, cyclobutyl, cyclopropyl and branched and straight chain alkyl groups.

Other aldehydes useful in the production of the products of this invention include:

2-, 3- and 4-diphenylylcarboxaldehyde
2,3,4-dimethoxydiphenylylcarboxaldehyde
2-, 3-, and 4-azodiphenylylcarboxaldehyde
2-, 3-, and 4-oxydiphenylylcarboxaldehyde
2-, 3-, and 4-iminodiphenylylcarboxaldehyde
2-, 3-, and 4-methoxyoxydiphenylene-4'-carboxaldehyde
2-, 3-, and 4-hexyloxyoxydiphenylene-4'-carboxaldehyde
2-, 3-, and 4-methylthio-oxydiphenylene-4'-carboxaldehyde
2-, 3-, and 4-dimethylamino-oxydiphenylene-4'-carboxaldehyde
2-, 3-, and 4-ethoxyoxydiphenylene-3'-carboxaldehyde
2-, 3-, and 4-ethylthiooxydiphenylene-3'-carboxaldehyde
2-, 3-, and 4-dimethylaminooxydiphenylene-3'-carboxaldehyde
N-methyl-2-, 3- and 4-iminodiphenylene-3'-carboxaldehyde
N-propyl-2-, 3- and 4-iminodiphenylene-4'-carboxaldehyde
N-hexyl-2-, 3- and 4-iminodiphenylene-4'- carboxaldehyde
N-n-propyl-2-, 3- and 4-iminodiphenylene-4'-carboxaldehyde
N-methyl-2-, 3-, and 4-dimethylaminoiminodiphenylene-3'-carboxaldehyde
2-, 3-, and 4-dimethylaminoazodiphenylene-4'-carboxaldehyde N,N-disubstituted formamides used in the process of this invention can be readily prepared by the reaction of formic acid or methyl formate with a diamine. Included among the N,N-disubstituted formamides used to prepare compounds of this invention are N,N-di-n-hexylformamide, N,N-dicyclophentylformamide, N,N-n-hexylcyclohexylformamide, N,N-phenylcyclohexylformamide, N,N-phenylethylformamide, N,N-phenylisopropylformamide and the like.

The aldehydes described above can be prepared as described in Wagner and Zook, Synthetic Organic Chemistry, John Wiley and Sons, New York, 1953, pp. 279–315.

The following examples further illustrate the invention. Unless otherwise indicated in the examples, parts are by weight. Pressures are atmospheric, and temperatures are in degrees centigrade.

EXAMPLE 1 p-Methoxy-α-trifluoromethylcinnamoyl fluoride

To 13 g. of anisaldehyde in a distilling flask was added 18 g. of perfluoromethacrylyl fluoride. There was an exothermic reaction with evolution of gas. After this subsided, the product was distilled at 1 mm. pressure to obtain 17.9 g. of p-methoxy-α-trifluoromethylcinamoyl fluoride boiling at 86° C./1 mm. This was washed with water and redistilled at 83° C./0.75 mm. The product was a colorless liquid, $n_D^{25}$ 1.5371.

*Analysis.*—Calcd. for $C_{11}H_8F_4O_2$ (percent): C, 53.27; H, 3.25; F, 30.65. Found (percent): C, 53.56; H, 3.28; F, 30.13.

EXAMPLE 2

2-trifluoromethyl-3-dimethylaminoacryloyl fluoride

To 89.0 g. (0.5 mole) of perfluoromethacrylyl fluoride, which was stirred in a dry nitrogen atmosphere in a flask immersed in an ice bath, 36.5 g. (0.5 mole) of dimethylformamide was added at a rate which maintained the reaction temperature at 12–15° (about one hour). The gas evolution was immediate and continuous during the addition. After the addition was complete (about one hour), the reaction mixture was stirred under a slow stream of nitrogen at room temperature for two hours and then distilled to give 74.5 g. of 2-trifluoromethyl-3-dimethylaminoacryloyl fluoride in the form of a pale yellow liquid (81% yield), B.P. 67–68° C. (0.7 mm.).

The compound exhibited absorption in the infrared at 5.64μ (COF) and 6.12μ (—C=C—). The compound had the following maxima in the U.V.:

$\lambda_{max.}^{EtOH}$

280mμ(ε 15,500) and $\lambda_{max.}^{ether}$ 281 mμ (ε 16,400). The $F^{19}$ n.m.r. spectrum showed there were two isomers present in a 60:40 ratio. The main isomer showed absorption (relative to trichlorofluoromethane external standard) at 3,230 c.p.s. [$CF_3$, doublet ($J_{CF_3/COF}=14$ c.p.s.)] and at −1,470 c.p.s. [COF, quartet ($J_{CF_3/COF}=14$ c.p.s.) into doublets ($J_{H/COF}=7$ c.p.s.)]. The minor isomer had absorption at +2,780 c.p.s. ($CF_3$, doublet ($J_{CF_3/COF}=16$ c.p.s.)) and at −660 c.p.s. [COF, quartet ($J_{CF_3/COF}=16$ c.p.s.)].

The $H^1$ n.m.r. showed two overlapping peaks centered at 6.75τ (6H, —N($CH_3$)$_2$ of the two double bond isomers) and a doublet ($J_{H/COF}=7$ c.p.s.) centered at 2.5τ which overlapped with a broad band (1H).

*Analysis.*—Calcd. for $C_6H_7F_4NO$ (percent): C, 38.92; F, 41.05; H, 3.81; N, 7.57. Found (percent): C, 39.42; F, 41.03; H, 3.92; N, 7.53.

EXAMPLE 3

5-(p-dimethylaminophenyl)-2-trifluoromethyl-2,4-pentadienoyl fluoride

To a stirred suspension of p-dimethylamino cinnamaldehyde (17.0 g., 0.097 mole) in 80 ml. of ether, in a dry nitrogen atmosphere, 18.0 g. (0.101 mole) of perfluoromethacrylyl fluoride was added at rate to keep the reaction temperature between 25–30°. (No cooling was necessary.) After the addition was completed, the reaction mixture consisted of a deep red solution in which was suspended red solid and some yellow solid (indicating unreacted aldehyde). An additional 30 ml. of ether was added. Then 25 ml. of benzene was added about most of the solids dissolved) and the mixture was refluxed for two hours until the evolved gases failed to smoke when they came in contact with paper saturated with ammonia. The material was then concentrated in vacuo to give 28.0 g. of 5 - (p - dimethylaminophenyl) - 2 - trifluoromethyl-2,4-pentadienoyl fluoride in the form of a violet solid, M.P. 96–105°. On recrystallization from ether/hexane gave material with M.P. 119–121°. This material was recrystallized from ether to give an analytical sample, M.P. 122–124°.

This compound showed absorption in the infrared at 5.57τ (COF) and had the following maxima in the ultraviolet:

$\lambda_{max.}^{cyclohexane}$ 435 mμ (ε 34,500);

$\lambda_{max.}^{EtOH}$ 465 mμ (ε 38,500).

The $H_1$ n.m.r. spectrum had a singlet at 6.9τ [6H, —N($CH_3$)$_2$], a doublet at 3.3τ (J=9.5 c.p.s., 2H) and a doublet at 2.45τ (J=9.5 c.p.s.) which overlapped with a complex multiplet (total 5H). These latter absorptions correspond to an $A_2B_2$ pattern of the four aromatic protons; the low field doublet overlaps with the vinyl protons. The $F^{19}$ n.m.r. spectrum (relative to trichlorofluoromethane internal standard) absorption at +3,470 c.p.s. ($CF_3$, doublet, $J_{COF/CF_3}=13.6$ c.p.s. and −2,030 c.p.s. (COF complex pattern). The single $CF_3$ absorption showed this compound was a single isomer

*Analysis.*—Calcd. for $C_{14}F_4H_{13}ON$ (percent): C, 58.52; F, 26.45; H, 4.57; N, 4.88. Found (percent): C, 58.43; F, 26.47; H, 4.99; N, 4.84.

A sample of this material was recovered unchanged after refluxing in methanol for a half hour.

EXAMPLE 4 p-Dimethylamino-α-trifluoromethylcinnamoyl fluoride

To a stirred suspension of 14.9 g. (0.1 mole) of p-dimethylaminobenzaldehyde in 80 ml. of ether in a dry nitrogen atmosphere, 19.0 g. (0.106 mole) of perfluoromethacrylyl fluoride was added. The rate of addition was adjusted to give a steady evolution of gas ($COF_2$) and to maintain the reaction temperature between 25–30° C. After the addition was completed (total time about two hours) all solids had dissolved and the solution was dark green. The solvent was removed with a rotary evaporator in vacuo to give 26.0 g. of p-dimethylamino-α-trifluoromethylcinnamoyl fluoride in the form of a yellow solid. This material was sublimed at 0.15 mm. and 65° C. to give 24.0 g. (92%) of an analytically pure yellow solid, M.P. 62–69° C.

*Analysis.*—Calcd. for $C_{12}F_4H_{11}NO$ (M.W., 261.2) (percent): C, 55.18; F, 29.10; H, 4.25; N, 5.37. Found (percent): C, 55.28; F, 29.12; H, 4.37; N, 5.71.

The compound exhibited absorption in the infrared ($CHCl_3$) at 5.56μ (C=O of acid fluoride). The compound had the following maxima in the U.V.:

$\lambda_{max.}^{cyclohexane}$ 395 mμ (ε 33,300), $\lambda_{max.}^{EtOH}$ 412.5 mμ (ε 32,600).

The $H^1$ n.m.r. absorption spectrum had absorption at 6.92τ (6H singlet, —N($CH_3$)$_2$), at 3.4τ (2H, doublet, J=10 cps., aromatic H) and at 2.3τ (doublet, J=10 cps., aromatic H) which overlapped with a complex multiplet

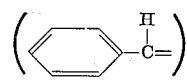

to total three protons. This latter absorption corresponds to an $A_2B_2$ system where the low field doublet overlaps with the benzylic proton.

The $F^{19}$ n.m.r. absorption spectrum indicated the material was a mixture of cis-trans double bond isomers in the ratio 79:21. The main isomer had absorption (relative to trichlorofluoromethane external standard) at +3,440 cps. [$CF_3$, doublet ($J_{CF_3/COF}=13.6$ cps.) into doublets ($J_{CF_3/H}=1.3$ cps.)] and at −2,120 cps. [COF, quartet ($J_{CF_3/COF}=13.6$ cps.) into doublets ($J_{H/COF}=7.2$ cps.)].

The minor isomer had absorption at +3,230 cps [CF$_3$, (J$_{CF_3/COF}$=13.8 cps.)] and at —1,170 cps. [COF, quartet J$_{CF_3/COF}$=13.8 cps.) into doublets (J$_{COF/H}$=2.2 cps.)].

EXAMPLE 5

2-trifluoromethyl-3-(2-furyl)-acryloyl fluoride

A Carius tube was charged at Dry Ice temperature with 35.6 g. (0.2 mole) of perfluoromethacrylyl fluoride and 19.2 g. (0.2 mole) of furfural and sealed. After coming to room temperature, the reaction mixture consisted of a red homogeneous solution. This was left overnight at room temperature and then heated on the steam bath for three hours. The tube was cooled in Dry Ice and opened to a liquid nitrogen trap to collect 13.0 g. (98%) of carbonyl fluoride (IR, 5.1μ). The liquid remaining was distilled to give 24.0 g. (58%) of 2-trifluoromethyl-3-(2-furyl)- acryloyl fluoride in the form of a pale green mobile liquid, B.P. 74–78° (15 mm.), which absorbed in the infrared at 5.50μ (COF). Repeated distillation failed to remove the color. The compound had the following maxima in the U.V.:

$\lambda_{max.}^{cyclohexane}$ 328 mμ (ε 20,700).

$\lambda_{max.}^{EtOH}$ 332 mμ (ε 18,100).

The F$^{19}$ n.m.r. spectrum showed that there were two isomers present in a 96:4 ratio. The main isomer showed absorption (relative to trichlorofluoromethane external standard) at +3,560 cps. [CF$_3$ doublet (J$_{CF_3/COF}$=13.6 cps.)] and —2,040 cps. [(COF, quartet (J$_{CF_3/COF}$=13.6 cps.) into doublets (J$_{H/COF}$=7.0 cps.) into doublets (J≅ 0.7 cps.)]. The minor isomer had absorption +3,380 cps. [CF$_3$, doublet (J$_{CF_3/COF}$=13.4 cps.)] and 1,180 cps. [COF, quartet (J$_{CF_3/COF}$=13.4 cps.) into doublets (J$_{COF/H}$=1.8 cps.)]. The H$^1$ n.m.r. showed absorption at 3.3τ [doublet (J=3.8 cps.) into doublets (J=1.8 cps.) into doublets (J≅0.6 cps.), 1H] and a complex multiplet centered at 2.2τ (3H).

Analysis.—Calcd. for C$_8$H$_4$F$_4$O$_2$ (percent: C, 46.17; H, 1.94; F, 36.52. Found (percent: C, 46.46; H, 2.09; F, 36.57.

EXAMPLE 6

2-trifluoromethyl-3-(3-indolyl)acryloyl fluoride

To a stirred suspension of indole-3-carboxaldehyde (14.5 g., 0.1 mole) in 60 ml. of ether, in a dry nitrogen atmosphere in a flask immersed in an ice bath, 19.0 g. (0.107 mole) of perfluoromethacrylyl fluoride was added at a rate to keep the temperature between 15–20° C. and maintain a steady evolution of gas. After the addition was completed, the reaction was stirred for two hours at 40° C. and then concentrated in vacuo to give 28.3 g. of 2-trifluoromethyl-3-(3-indolyl)acryloyl fluoride in the form of a yellow solid. The infrared spectrum in mineral oil showed absorption at 3.0μ (—NH), 5.6μ (COF). This product rapidly darkened. It was converted to the methyl ester by dissolving the total crude product in 50 ml. of methanol adding 20 ml. of pyridine and stirring overnight. The reaction was diluted with 100 ml. of methylene chloride and then washed consecutively with water (1× 50 ml.), 10% HCl (2× 50 ml.), water, saturated sodium bicarbonate (1× 50 ml.), and brine. The methylene chloride solution was dried over MgSO$_4$, filtered, and concentrated in vacuo to give 23.2 g. of methyl 2-trifluoromethyl-3-(3-indolyl)-acrylate in the form of an orange solid. A sample was recrystallized four times from cyclohexane/benzene and sublimed to give an analytical sample, M.P. 144.5–145.5° C. The infrared spectrum (CHCl$_3$) had absorption at 2.92μ (N=H), 3.39μ and 3.51μ (saturated C=H), 5.85μ (conj. ester C=O) 6.21μ, 6.34μ, 6.61μ and 6.72μ (conj. C=C, C=N and aromatic (C=C) and strong absorption in the 8–10μ region (C—F and a C—O). The compound had the following maxima in the U.V.:

$\lambda_{max.}^{EtOH}$ 351 mμ (ε 16,600), 275 mμ (ε 7,440), 264 mμ (ε 8,440), 218 mμ (ε 24,700).

The F$^{19}$ n.m.r. spectrum showed two CF$_3$ groups (86:14 ratio) corresponding to the cis-trans isomers. The major CF$_3$ group appeared at +3,417 c.p.s. (trichlorofluoromethane internal standard) and the minor CF$_3$ at +3,326 cps. Each was split into doublet (J=1 cps.). The H$^1$ n.m.r. spectrum consisted of a singlet at 6.13τ (3H, CO$_2$CH$_3$), a complex multiplet between 2.1 and 2.8τ (4H, aromatic H), a poorly resolved multiplet (possibly a quartet) at 2.0τ (1H,

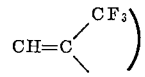

a doublet at 1.37τ (1H, J=3 cps), and broad absorption centered at 2.25τ (1H, N—H).

Analysis.—Calcd. for C$_{13}$H$_{10}$F$_3$NO$_2$ (percent: C, 58.00; H, 3.75; F, 21.17; N, 5.21. Found (percent): C, 58.33; H, 3.83; F, 20.88; N, 5.49.

EXAMPLE 7

2-trifluoromethyl-3-(N-methyl-2-pyrolyl)acryloyl fluoride

To 40.0 g. (0.225 mole) of perfluoromethacrylyl fluoride, which was stirred in a dry nitrogen atmosphere in a flask immersed in an ice bath, 21.8 g. (0.20 mole) of N-methylpyrrole-2-carboxaldehyde was added at a rate which maintained the reaction temperature below 25° C. (about one hour). A gentle stream of nitrogen was passed through the flask during the course of the reaction to remove COF$_2$ as it was formed. The reaction mixture was concentrated and the crude product was washed with hexane to give 32 g. (73%) of purple solid which was sublimed twice (50° C. and 0.5 mm.) to give 2-trifluoromethyl-3-(N-methyl-2-pyrrolyl)-acryloyl fluoride in the form of a yellow solid, M.P. 58–63° C.

The compound exhibited absorption in the infrared (KBr) at 5.62μ (conjugated >C=O of COF) and 6.3μ (conjugated C=C). The compound had the following maxima in the U.V.:

$\lambda_{max.}^{EtOH}$ 371 mμ (ε 31,200)

$\lambda_{max.}^{cyclohexane}$ 365 mμ (ε 28,500), 355 mμ (ε 27,400).

The F$^{19}$ n.m.r. spectrum showed that there were two isomers present in a 76:24 ratio. The main isomer showed absorption (relative to trichlorofluoromethane internal standard) at +3,500 c.p.s. [CF$_3$, doublet (J$_{CF_3/COF}$=15.2 c.p.s.) into doublets (J$_{H_1/CF_3}$=1.4 c.p.s.)] and at —1,887 c.p.s. [COF, quartet (J$_{CF_3/COF}$=15.2 c.p.s.) into doublets (J$_{COF/H_1}$=7.4 c.p.s.) into doublets (J$_{COF/H_2}$=1.2 c.p.s.)]. The minor isomer had absorption at +3,419 c.p.s. [CF$_3$, doublet (J$_{COF/CF_3}$=14.6 c.p.s.) into doublets (J$_{H_1/CF_3}$=1.8 c.p.s.) into doublets (J$_{H_2/CF_3}$=0.7 c.p.s.)] and at —1,033 c.p.s. [COF, quartet (J$_{COF/CF_3}$=14.6 c.p.s.) into doublets (J$_{H_1}$=2.4 c.p.s.)]

The H$^1$ n.m.r. spectrum (CDCl$_3$) showed a singlet at 6.25τ (3H, N—CH$_3$), a doublet into doublets at 3.65τ (1H, J$_1$=4.8 c.p.s., J$_2$=2.6 c.p.s., J$_3$=0.6 c.p.s.) and complex poorly resolved absorption between 2τ and 3τ (3H).

Analysis.—Calcd. for C$_9$H$_7$F$_4$NO (percent): C, 48.88; H, 3.19; F, 34.37; N, 6.34. Found (percent): C, 49.65, 49.52; H, 3.37, 3.27; F, 34.18; N, 6.59.

EXAMPLE 8

2-trifluoromethylcinnamoyl fluoride

A Carious tube was charged with 42.0 g. of benzaldehyde (0.4 mole) and 36.0 g. of perfluoromethacrylyl fluoride and heated in 150° C. for 40 hours. The tube was then cooled in solid carbon dioxide and opened. The gases were vented and the product distilled to obtain 13.8 g. of crude 2-trifluoromethylcinnamoyl fluoride in the form of a colorless liquid. The first 9.1 g. boiled at 110–122° C. at 18 mm. pressure and the last When the aldehydes shown in column A of the following table are substituted for the aldehydes reacted with perfluoromethacrylyl fluoride in the examples shown in column B, the substituted acid fluorides shown in column C are obtained. By procedure 8* is meant that the procedure of Example 8 is followed except 1 ml. of benzene for each gram of the combined weight of aldehyde plus perfluoromethacrylyl fluoride is charged to the Carius tube. Benzene serves as a reaction medium. During the recovery step the benzene is removed by distillation before the indicated product is obtained.

TABLE

| Item | (A) Aldehyde employed | (B) Procedure of Example— | (C) Product obtained |
|---|---|---|---|
| 1 | N,N-diethylformamide | 2 | 3-diethylamino-2-trifluoromethylacryloyl fluoride. |
| 2 | N-methyl-N-phenylformamide | 6 | 3-(N-methyl-N-phenylamino)-2-trifluoromethylacryloyl fluoride. |
| 3 | N,N-dicyclohexylformamide | 8 | 3-dicyclohexylamino-2-trifluoromethylacryloyl fluoride. |
| 4 | 1-naphthaldehyde | 8 | 3-(1-naphthyl)-2-trifluoromethylacryloyl fluoride. |
| 5 | 2-naphthaldehyde | 8 | 3-(2-naphthyl)-2-trifluoromethylacryloyl fluoride. |
| 6 | 2-anthraldehyde | 8 | 3-(2-anthryl)-2-trifluoromethylacryloyl fluoride. |
| 7 | 9-anthraldehyde | 8 | 3-(9-anthryl)-2-trifluoromethylacryloyl fluoride. |
| 8 | 5-chrysenecarboxaldehyde | 8 | 3-)5-chrysyl)-2-trifluoromethylacryloyl fluoride. |
| 9 | 2-thiophenecarboxaldehyde | 5 | 3-(2-thienyl)-2-trifluoromethylacryloyl fluoride. |
| 10 | p-(p-Dimethylaminophenylazo)benzaldehyde | 3 | p-(p-Dimethylaminophenylazo)-2-trifluoromethylcinnamoyl fluoride. |
| 11 | p-Methylthiobenzaldehyde | 5 | p-Methylthio-2-trifluoromethylcinnamoyl fluoride. |
| 12 | 4-oxazolecarboxaldehyde | 5 | 3-(4-oxazolyl)-2-trifluoromethylacryloyl fluoride. |
| 13 | 5-isoxazolecarboxaldehyde | 5 | 3-(5-isoxazolyl)-2-trifluoromethylacryloyl fluoride. |
| 14 | 4-thiazolecarboxaldehyde | 5 | 3-(4-thiazolyl)-2-trifluoromethylacryloyl fluoride. |
| 15 | 4-imidazolecarboxaldehyde | 6 | 3-(4-imidazolyl)-2-trifluoromethylacryloyl fluoride |
| 16 | 1,2,3-triazole-4-carboxaldehyde | 6 | 3-(1,2,3-triazol-4-yl)-2-trifluoromethylacryloyl fluoride. |
| 17 | Benzofurfural | 5 | 3-(2-benzofuryl)-2-trifluoromethylacryloyl fluoride. |
| 18 | 2-thianaphthenecarboxaldehyde | 5 | 3-(2-benzothienyl)-2-trifluoromethylacryloyl fluoride. |
| 19 | p-Phenoxybenzaldehyde | 8 | p-Phenoxy-2-trifluoromethylcinnamoyl fluoride. |
| 20 | p-(N-methyl-N-phenylamino) benzaldehyde | 8 | p-(N-methyl-N-phenylamino)-2-trifluoromethylcinnamoyl fluoride. |
| 21 | 2-thiazolecarboxyaldehyde | 5 | 3-(2-thiazolyl)-2-trifluoromethylacryloyl fluoride. |
| 22 | 1-methyl-2-benzimidazolecarboxaldehyde | 4 | 3-(1-methyl-2-benzimidazolyl)-2-trifluoromethylacryloyl fluoride. |
| 23 | 2-benzoxazolecarboxaldehyde | 5 | 3-(2-benzoxazolyl)-2-trifluoromethylacryloyl fluoride. |
| 24 | 2-benzothiazolecarboxaldehyde | 5 | 3-(2-benzothiazolyl)-2-trifluoromethylacryloyl fluoride. |

4.7 g. boiled at 85–87° C. at 5 mm. pressure. This product was separated into its cis and trans isomers by gas chromatography. The infrared spectrum of the first isomer showed absorption ($CCl_4$) at $5.5\mu$ (conjugated COF) and $6.12\mu$ (conjugated C=C). The compound had the following maxima in the U.V.:

$\lambda_{max.}^{cyclohexane}$ 282 m$\mu$ ($\epsilon$ 10,200), 220 m$\mu$ ($\epsilon$ 6,800)

$\lambda_{max.}^{EtOH}$ 285 m$\mu$ ($\epsilon$ 12,500), 220 m$\mu$ ($\epsilon$ 6,470)

$\lambda_{max.}^{isooctane}$ 280 m$\mu$ ($\epsilon$ 10,700)

The $F^{19}$ n.m.r. spectrum consisted of single $CF_3$ and COF resonances which showed that this product was one isomer. The $CF_3$ resonance, centered at +3,670 c.p.s. (relative to trichlorofluoromethane), was a doublet ($J_{COF/CF_3}$=9.5 c.p.s.) into doublets ($J_{H/CF_3}$=1.6 c.p.s.); the COF resonance, centered at −2,350 c.p.s., was a quartet ($J_{COF/CF_3}$=9.5 c.p.s.) into doublets ($J_{H/COF}$=5.4 c.p.s.). The $H^1$ n.m.r. showed a sharp peak at 2.55$\tau$ (5H, aromatic H) and a doublet ($J_{H/COF}$=5.9 c.p.s.) into overlapping quartets ($J_{H/CF_3}$=1.6 c.p.s.) centered at 2.23$\tau$ (1H, vinyl H). (These coupling constants should be ±0.3 c.p.s.)

*Analysis.*—Calcd. for $C_{10}H_6OF_4$ (M.W., 218.1) (percent): C, 55.06; H, 2.77; F, 34.84. Found (percent): C, 55.36; H, 2.84; F, 34.88.

The infrared spectrum of the second isomer showed absorption ($CCl_4$) at $5.5\mu$ (COF) and $6.12\mu$ (C=C) and differed from the other isomer in the region between 7–9$\mu$. The $F^{19}$ n.m.r. spectrum ($CDCl_3$, relative to Freon® 11 external) showed a $CF_3$ group at +3,321 c.p.s. [doublet ($J_{COF/CF_3}$=11.0 c.p.s.)] and COF group at 1,381 c.p.s. [quartet ($J_{COF/CF_3}$=11.0 c.p.s.)]. The $H^1$ n.m.r. showed a sharp peak (external TMSi) at 2.55$\tau$ (5H, aromatic H) and absorption at 1.7$\tau$ (1H, vinyl H).

$\lambda_{max.}^{isooctane}$ 281 m$\mu$ ($\epsilon$ 16,100)

3-substituted - 2 - trifluoromethylacryloyl fluorides are useful as waterproofing agents for various papers and cellulosic materials. Some of these compounds are also useful as dyes for fibers and fabrics composed of silk, wool, cellulose acetate, and nylon.

These uses are further illustrated in the examples below.

EXAMPLE A

Two strips of filter paper (1 sq. in.) were each treated with 10 drops of a 50% solution of 2-trifluoromethyl-3-dimethylaminoacryloyl fluoride in ether. The papers were dried. One strip was additionally treated with three drops of a 50% solution of pyridine in ether. After drying, the paper was covered with a glass plate and heated on a hot plate at 85–85° C. for 10–15 minutes and then cooled to room temperature. When drops of water were placed on the treated papers, both showed strong resistance to absorption of the water, whereas an untreated strip of filter paper absorbed a drop of water immediately. This procedure was repeated with identical results using p-dimethylamino - 2 - trifluoromethylcinnamoyl fluoride in place of 2-trifluoromethyl - 3 - dimethylaminoacryloyl fluoride.

Compounds of Formula I containing p-dialkylaminophenyl groups are useful as dyes. This is illustrated as follows:

EXAMPLE B

To a solution of 0.030 g. of p-dimethylamino-2-trifluoromethylcinnamoyl fluoride, swatches of cellulose acetate, 66 nylon, silk and wool fabrics were added. Then a solution of 3 ml. of an 0.1% aqueous solution of a sulfonated lignin dispersant in 10 ml. of water was added. The mixture was warmed at about 60° C. for five minutes and then allowed to stand overnight at room temperature. The swatches were washed with soap and water and rinsed until the rinsings were colorless. When dry the cellulose acetate, 66 nylon, silk and wool swatches were all dyed yellow.

EXAMPLE C

To a solution of 0.05 g. of p-dimethylamino-2-trifluoromethylcinnamoyl fluoride in 10 ml. of benzene and 10 ml. of pyridine a 2-inch square of cotton broadcloth was added. The mixture was heated under reflux for 24 hours. The cloth was washed with soap and water and then with acetone until the acetone washings were colorless. The dried fabric was dyed lemon yellow.

EXAMPLE D

To a solution of 0.050 g. of p-dimethylamino-2-trifluoromethyl-2,4-pentadienoyl fluoride in 18 ml. of ethanol containing swatches of cellulose acetate, 66 nylon, silk and wool fabrics was added a solution of 3 ml. of an 0.1% aqueous solution of a sulfonated lignin dispersant in 12 ml. of water. The mixture was heated for five minutes at about 60° C. and then allowed to stand overnight at room temperature. The swatches were washed and dried as in Example B. They were all dyed orange.

The foregoing detailed description has been given for clarity of understanding only and no unnecessary limitations are to be understood therefrom. The invention is not limited to the exact details shown and described, for obvious modifications will be apparent to those skilled in the art.

The embodiments of the invention in which an exclusive property or privilege is claimed are defined as follows:

1. A compound of the formula $$Z-\overset{H}{\underset{}{C}}=\overset{CF_3}{\underset{}{C}}-COF$$

wherein Z is a monovalent radical selected from the group consisting of (a) 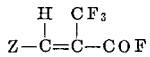

and (b) 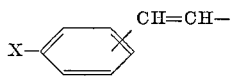

wherein X is selected from the group consisting of H, R'O—, R'S— and R'$_2$N—, R' being lower alkyl or cyclo-loweralkyl.

2. The compound of claim 1 wherein Z is p-methoxyphenyl; said compound being p-methoxy-α-trifluoromethylcinnamoyl fluoride.

3. The compound of claim 1 wherein Z is 1-[2-(p-dimethylaminophenyl)]ethenyl; said compound being 5-(p-dimethylaminophenyl)-α-trifluoromethyl - 2,4 - pentadienoyl fluoride.

4. The compound of claim 1 wherein Z is p-dimethylaminophenyl; said compound being p-dimethylamino-α-trifluoromethylcinnamoyl fluoride.

5. The compound of claim 1 wherein Z is phenyl; said compound being α-trifluoromethylcinnamoyl fluoride.

6. A process for preparing a compound of the formula $$Z-\overset{H}{\underset{}{C}}=\overset{CF_3}{\underset{}{C}}-COF$$

which comprises reacting perfluoromethacrylyl fluoride with a formyl compound of the formula ZCHO, where Z is a monovalent radical selected from the group consisting of (a) 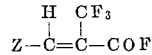

and (b) 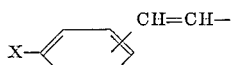

wherein X is selected from the group consisting of H, R'O—, R'S— and R'$_2$N—, R' being lower alkyl or cyclo-loweralkyl.

7. A process of claim 6, wherein Z of the starting material ZCHO is p-methoxyphenyl.

8. A process of claim 6, wherein Z of the starting material ZCHO is 1-[2-(p-dimethylaminophenyl)]ethenyl.

9. A process of claim 6, wherein Z of the starting material ZCHO is p-dimethylaminophenyl.

10. A process of claim 6, wherein Z of the starting material ZCHO is phenyl.

References Cited

FOREIGN PATENTS 3,538,081  11/1970  England _____ 260—239
3,423,378  1/1969   England _____ 260—80.8

LORRAINE A. WEINBERGER, Primary Examiner

E. J. GLEIMAN, Assistant Examiner

U.S. Cl. X.R.

260—207, 207.1, 302, 304, 307, 308, 309, 326.1, 326.13, 326.3, 330.5, 332.2, 346.2, 347.3